(12) United States Patent
Kim et al.

(10) Patent No.: US 6,793,719 B2
(45) Date of Patent: Sep. 21, 2004

(54) CONCENTRATING CHAMBER IN OXYGEN CONCENTRATING APPARATUS

(75) Inventors: Min Jung Kim, Suwin (KR); Tae Soo Lee, Gyonggi-do (KR)

(73) Assignee: Oxus Co., Ltd., Seoul (KR)

( * ) Notice: Subject to any disclaimer, the term of this patent is extended or adjusted under 35 U.S.C. 154(b) by 0 days.

(21) Appl. No.: 10/272,297

(22) Filed: Oct. 17, 2002

(65) Prior Publication Data

US 2003/0084789 A1 May 8, 2003

(30) Foreign Application Priority Data

Oct. 22, 2001 (KR) ........................................ 2001-65132

(51) Int. Cl.[7] ............................................ B01D 53/053
(52) U.S. Cl. ............................ 96/130; 95/130; 96/136; 96/137; 96/142; 96/144; 96/149
(58) Field of Search ............................ 95/130; 96/108, 96/130, 134–138, 142–144, 149, 151

(56) References Cited

U.S. PATENT DOCUMENTS

| | | | | | |
|---|---|---|---|---|---|
| 3,258,899 A | * | 7/1966 | Coffin | ........................... | 96/114 |
| 3,464,186 A | * | 9/1969 | Hankison et al. | ............... | 96/115 |
| 3,483,677 A | * | 12/1969 | Pinto | ........................... | 96/137 |
| 3,572,008 A | * | 3/1971 | Hankison et al. | ............... | 95/105 |
| 4,071,337 A | * | 1/1978 | Evans | ........................... | 96/114 |
| 4,572,725 A | * | 2/1986 | Kojima | ........................... | 96/137 |
| 4,655,801 A | * | 4/1987 | Kojima et al. | ................. | 96/137 |
| 4,673,419 A | * | 6/1987 | Kojima | ........................... | 96/144 |
| 4,892,569 A | * | 1/1990 | Kojima | ........................... | 96/113 |
| 5,129,927 A | * | 7/1992 | Tsubouchi | ..................... | 96/113 |
| 5,268,021 A | * | 12/1993 | Hill et al. | ....................... | 95/98 |
| 5,275,642 A | * | 1/1994 | Bassine | ........................ | 96/149 |
| 5,340,381 A | * | 8/1994 | Vorih | ............................. | 95/21 |
| 5,549,736 A | * | 8/1996 | Coffield et al. | ................ | 96/133 |
| 5,578,115 A | * | 11/1996 | Cole | ............................. | 96/121 |
| 5,730,778 A | * | 3/1998 | Hill et al. | ....................... | 95/12 |
| 5,871,564 A | * | 2/1999 | McCombs | ..................... | 95/98 |
| 5,997,617 A | * | 12/1999 | Czabala et al. | ................ | 96/130 |
| 6,162,283 A | * | 12/2000 | Conrad et al. | ................. | 95/98 |
| 6,217,635 B1 | * | 4/2001 | Conrad et al. | ................. | 95/97 |
| 6,391,098 B1 | * | 5/2002 | Thomas | ......................... | 96/111 |

\* cited by examiner

*Primary Examiner*—Robert H. Spitzer
(74) *Attorney, Agent, or Firm*—Liniak, Berenato & White, LLC

(57) ABSTRACT

A concentrating chamber in an oxygen concentrating apparatus is provided, in which a process for adsorbing nitrogen to concentrate oxygen is performed in a single case. The concentrating chamber in an oxygen concentrating apparatus includes: a casing having upper and lower openings; an adsorption unit for performing an oxygen concentration through a compressed air and counter-flowing the stored oxygen to perform a nitrogen rinsing in the casing; a check valve operating according to a predetermined pressure, for supplying the oxygen concentrated in the adsorption unit and rinsing the nitrogen adsorbed in the adsorption unit; and upper and lower manifolds for supplying the concentrated oxygen through the upper and lower ends of the casing, or supplying the compressed air and simultaneously exhausting the rinsed nitrogen, through the upper and lower ends of the casing. The concentrating chamber in an oxygen concentrating apparatus includes at least two casings.

19 Claims, 10 Drawing Sheets

CONCENTRATING CHAMBER IN OXYGEN CONCENTRATING APPARATUS

BACKGROUND OF THE INVENTION

1. Field of the Invention

The present invention relates to a concentrating chamber in an oxygen concentrating apparatus capable of independently concentrating and storing oxygen through adsorption of nitrogen, and more particularly, to an independent oxygen concentrating chamber having an adsorption tower, an orifice, and a check valve which are essential components of an oxygen concentrating apparatus, in which a solenoid valve is included in addition to an adsorption tower having the orifice and the check valve, and a compressed air supply unit and a concentrated oxygen supply unit are excluded.

2. Description of the Related Art

An oxygen concentrating apparatus uses a property that an adsorption material such as zeolite adsorbs predetermined nitrogen gas. Nitrogen occupying about 80% in the air is adsorbed to zeolite better than oxygen be. Accordingly, if general air is introduced into an adsorption bed charged with an adsorption material, nitrogen components are adsorbed and the air from which the nitrogen components have been reduced is collected through an upper exit of the adsorption bed. The main components of the collected gas are oxygen. Here, the adsorption bed is a closed space and filled with an adsorption material, in which a gas pressure can be adjusted in the upper and lower ends of the adsorption bed.

Nitrogen adsorption and rinsing processes adsorb only nitrogen and separate oxygen from compressed air which passes through a predetermined adsorption material. Here, since an adsorption performance of zeolite being an adsorption material is sharply lowered as nitrogen is consistently adsorbed thereto, nitrogen adsorbed to zeolite should be rinsed every period of separation of oxygen, in order to restore an original performance of zeolite. This process will be called a nitrogen rinsing process. Nitrogen is adsorbed to the adsorption material, to thereby obtain the oxygen gas after adsorption. If the obtained oxygen becomes a predetermined pressure, the oxygen gas is moved into a storage chamber to be kept at a considerably high pressure. Then, part of the oxygen is counter-flown through the adsorption material, to thereby restore an adsorption function of the adsorption material through the nitrogen rinsing.

FIG. 1 shows an example of an oxygen concentrating apparatus which was filed on Dec. 14, 1999 and registered on Mar. 24, 2000, as Korean Utility Model Publication No. 2000-184654, by the same applicant as that of this application, in which an oxygen concentrating chamber according to the present invention can be applied.

The concentrating apparatus shown in FIG. 1 includes a compressed air supply unit 10 for compressing external air through a compressor and supplying the compressed air, an air inhale and exhaust control solenoid valve 20 for supplying the compressed air and exhausting rinsed nitrogen after concentration, a concentration and adsorption unit 30 for concentrating only oxygen through a predetermined nitrogen adsorption unit with the supplied compressed air until an oxygen pressure becomes a predetermined pressure and rinsing the adsorbed nitrogen, a check valve unit 40 for moving the concentrated oxygen to an oxygen storage unit 50 if an oxygen pressure in the concentration and adsorption unit 30 reaches a predetermined pressure, and then counter-flowing part of the concentrated oxygen through the nitrogen adsorption unit, in order to wash the adsorbed nitrogen, if an internal pressure in the nitrogen adsorption unit is lowered below a predetermined pressure, the oxygen storage unit 50 for storing the oxygen concentrated through the concentration and adsorption unit 30, and an outflow unit 60 for outflowing the stored oxygen while controlling an outflow pressure according to an outflow condition.

In more detail, the compressed air supply unit 10 includes a compressor, an air inhale filter for filtering the external air, and a muffler for reducing air inhaled noise. The solenoid valve 20 includes air exhaust noise during rinsing nitrogen. The oxygen concentration and nitrogen adsorption unit 30 is made of zeolite which is a nitrogen adsorption material. The check valve unit 40 includes a check valve and an orifice. The oxygen storage unit 50 is made of various complex inner and outer integration bed structures.

The concentrated oxygen obtained through the oxygen concentrating apparatus is controlled into a necessary pressure and then supplied through a pressure controller and a flow meter in the outflow unit 60.

Here, the orifice is a small hole connecting between the nitrogen adsorption unit and the storage unit. If the internal pressure of the concentrated oxygen becomes greater after separating the nitrogen in the nitrogen adsorption unit, the concentrated oxygen is moved to the check valve, and if the pressure in the nitrogen adsorption unit is lowered, the oxygen of the high pressure counter-flows through the nitrogen adsorption unit, in order to wash a nitrogen adsorption material to which nitrogen is adsorbed. At the same time of rinsing nitrogen, an air exhaust valve is opened to exhaust nitrogen and then closed again.

The above-described oxygen concentrating apparatus is simpler than an integration bed in a well-known medical oxygen supply apparatus. However, since a repeating process of oxygen concentration and nitrogen rinsing is performed alternately through a plurality of adsorption beds, it is essential to configure double-type plural beds for concentrating oxygen and rinsing nitrogen.

That is, when an air circuit is configured in an oxygen concentrating apparatus, an orifice should be connected between adsorption beds and a check valve should be connected in each adsorption bed, using an air tube in the upper end of each adsorption bed, in order to connect the components. Each check valve is connected to an oxygen storage unit (tank), in which case a tube and connection nipples are used in order to connect the orifice, the check valves, and oxygen storage tank, and in addition a hose and a pipe should be used. As a result, a connection structure of valves and pipes between the oxygen storage tank and the adsorption units cannot but be complicated, and thus the connection structure is not so easily understood, and is often out of order. Also, the conventional oxygen concentrating apparatus occupies a big space and needs a separate oxygen storage unit, to accordingly make it difficult to be made compact and thus to be distributed quickly.

In the present invention, an orifice, a check valve and an oxygen tank are configured into a single assembly in an adsorption unit.

That is, an adsorption unit 30 for performing oxygen concentration and simultaneously rinsing the adsorbed nitrogen to then exhaust the rinsed nitrogen, a check valve unit 40 which is closed during adsorbing and is opened if the oxygen concentration reaches a predetermined pressure, and an oxygen storage unit 50 for temporarily storing the concentrated oxygen, are integrated into a unit assembly as a portion of performing an oxygen concentration function through a substantial nitrogen separation. In the present invention, this is called an oxygen concentrating chamber or concentrating chamber.

In the case of the unit concentrating chamber as described above, a complicated tube connection structure can be removed from the upper end of the adsorption unit, and a remaining space in an adsorption tower is used as an oxygen storage space without using a separate storage tank, to thereby provide a concentrating chamber having a simple structure in the external configuration of the adsorption unit.

In the case that an oxygen concentrating apparatus is designed using the above-described concentrating chamber, a compressor, a muffler, a flow control supply unit, etc., are connected as they are. As a result, the number of components is reduced and the outer connector can be simpler. Also, the oxygen concentrating apparatus can be made much more easily, and the entire size of the oxygen concentrating apparatus is also reduced to thereby enable the oxygen concentrating apparatus to be made compact.

Further, when two or more concentrating chambers are configured together with a manifold in which a solenoid valve is formed, an oxygen concentrating apparatus combined with a plurality of concentrating chambers can be provided more simply.

SUMMARY OF THE INVENTION

To solve the above problems, it is an object of the present invention to provide an oxygen concentrating chamber in which separation and storing of oxygen is performed in a single casing by modifying a structural principle of an adsorption tower in a conventional oxygen concentrating apparatus.

It is another object of the present invention to provide an oxygen concentrating chamber in which an air moving unit for moving gas having an oxygen storage unit, a check valve and an orifice, and a unit for performing nitrogen adsorption and nitrogen rinsing, is configured in a single casing.

It is still another object of the present invention to provide an oxygen concentrating chamber integrated with a storage and air inhale and exhaust control unit necessary for oxygen storage, nitrogen adsorption and nitrogen rinsing, which is deposited in a single casing.

It is yet another object of the present invention to provide an oxygen concentrating chamber in which a solenoid structure appropriate for providing the concentrating chamber is configured in a lower manifold.

It is a further object of the present invention to provide an oxygen concentrating chamber in which an oxygen storage unit appropriate for providing the concentrating chamber is configured in an upper manifold.

To accomplish the above object of the present invention, there is provided a concentrating chamber in an oxygen concentrating apparatus, the concentrating chamber comprising: an oxygen concentrating unit formed of a casing having upper and lower openings, for performing an oxygen concentration through a compressed air and counter-flowing the stored oxygen to perform a nitrogen rinsing in the casing; and upper and lower manifolds for supplying the concentrated oxygen through the upper and lower ends of the oxygen concentrating unit, or supplying the compressed air and simultaneously exhausting the rinsed nitrogen, through the upper and lower ends of the oxygen concentrating unit.

Preferably, the oxygen concentrating unit in the oxygen concentrating chamber according to the present invention is comprised of an oxygen storage unit, a check valve unit and an adsorption unit which are stacked in the cylindrical casing, one over another in turn.

Preferably, the check valve unit in the oxygen concentrating chamber according to the present invention comprises a check valve for moving the concentrated oxygen to the oxygen storage unit if an internal pressure in the adsorption unit reaches a predetermined pressure after the oxygen has started to be concentrated, and an orifice for counter-flowing part of the concentrated oxygen of the high pressure into the adsorption unit if the pressure in the adsorption unit is lowered, and rinsing the nitrogen adsorbed in the adsorption material.

Preferably, the adsorption unit in the oxygen concentrating chamber according to the present invention further comprises upper and lower nets for preventing the adsorption material from flowing up and down.

Preferably, a mixed space called a dead zone is formed between the check valve unit and the adsorption unit in the oxygen concentrating chamber according to the present invention and a spring is further provided in the mixed space.

Preferably, a spring is further provided in the oxygen storage unit formed between the upper manifold and the check valve unit in the oxygen concentrating chamber according to the present invention.

According to another aspect of the present invention, there is also provided a concentrating chamber in an oxygen concentrating apparatus, the concentrating chamber comprising: a plurality of oxygen concentrating units installed in a casing made of a cylindrical body having upper and lower openings, for performing predetermined oxygen concentration and nitrogen rinsing; and upper and lower manifolds respectively installed in the upper and lower ends of the oxygen concentrating units installed in parallel in which the upper manifold forms a supply path for the concentrated oxygen and the lower manifold plays a role of supplying the compressed air and exhausting the rinsed nitrogen.

Preferably, the oxygen concentrating chamber having the plurality of oxygen concentrating units according to the present invention is comprised of an oxygen storage unit, a check valve unit, a porous plate and an adsorption unit which are stacked in the cylindrical casing, one over another in turn.

Preferably, the upper manifold in the oxygen concentrating chamber having the plurality of oxygen concentrating units according to the present invention is comprised of a check valve unit formed of a check valve and an orifice respectively corresponding to the concentrating units, and a mixed space, a porous plate and an adsorption unit are positioned in the left and right casings.

Preferably, an oxygen storage unit is formed between the left and right casings of the oxygen concentrating chamber having the plurality of oxygen concentrating units according to the present invention, and a vent is formed in the center of the check valve unit.

Preferably, the check valve unit in the oxygen concentrating chamber having the plurality of oxygen concentrating units according to the present invention comprises a check valve for moving the concentrated oxygen to the oxygen storage unit if an internal pressure in the adsorption unit reaches a predetermined pressure after the oxygen has started to be concentrated, and an orifice for counter-flowing part of the concentrated oxygen of the high pressure into the adsorption unit if the pressure in the adsorption unit is lowered, and rinsing the nitrogen adsorbed in the adsorption material, in which the check valve and the orifice face each other with the vent in the center.

Preferably, the adsorption unit in the oxygen concentrating chamber having the plurality of oxygen concentrating units according to the present invention further comprises upper and lower nets for preventing the adsorption material from flowing up and down.

Preferably, a mixed space called a dead zone is formed between the check valve unit and the adsorption unit in the oxygen concentrating chamber having the plurality of oxygen concentrating units according to the present invention and a spring is further provided in the mixed space.

Preferably, a spring is further provided in the oxygen storage unit formed between the upper manifold and the check valve unit in the oxygen concentrating chamber having the plurality of oxygen concentrating units according to the present invention.

BRIEF DESCRIPTION OF THE DRAWINGS

The above objects and other advantages of the present invention will become more apparent by describing the preferred embodiment thereof in more detail with reference to the accompanying drawings in which.

DETAILED DESCRIPTION OF THE INVENTION

Preferred embodiments of the present invention will be described with reference to the accompanying drawings.

Figure 1:
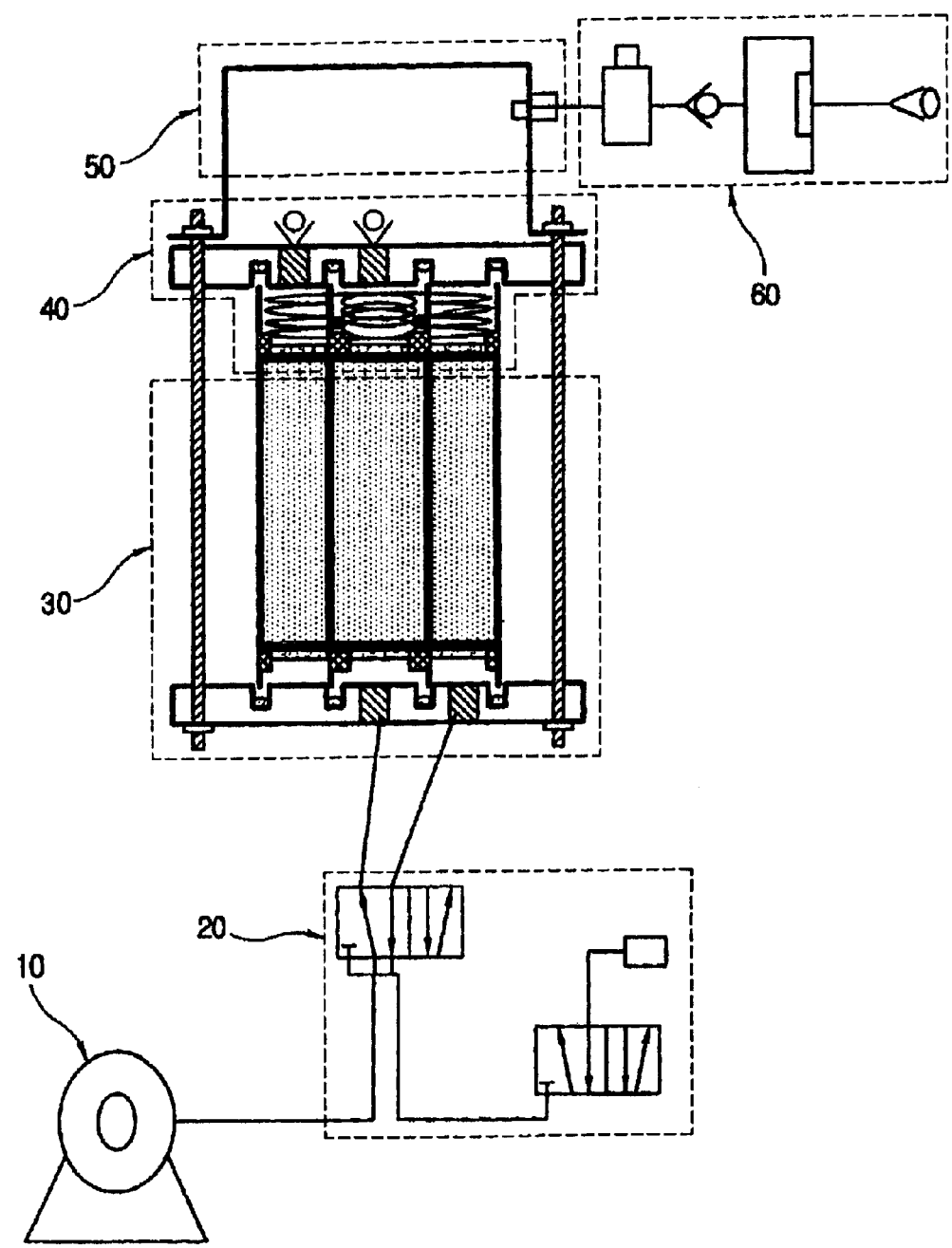
FIG. 1 is a schematic diagram showing the entire oxygen concentrating apparatus in which a concentrating chamber according to the present invention is applied.
Figure 2A:
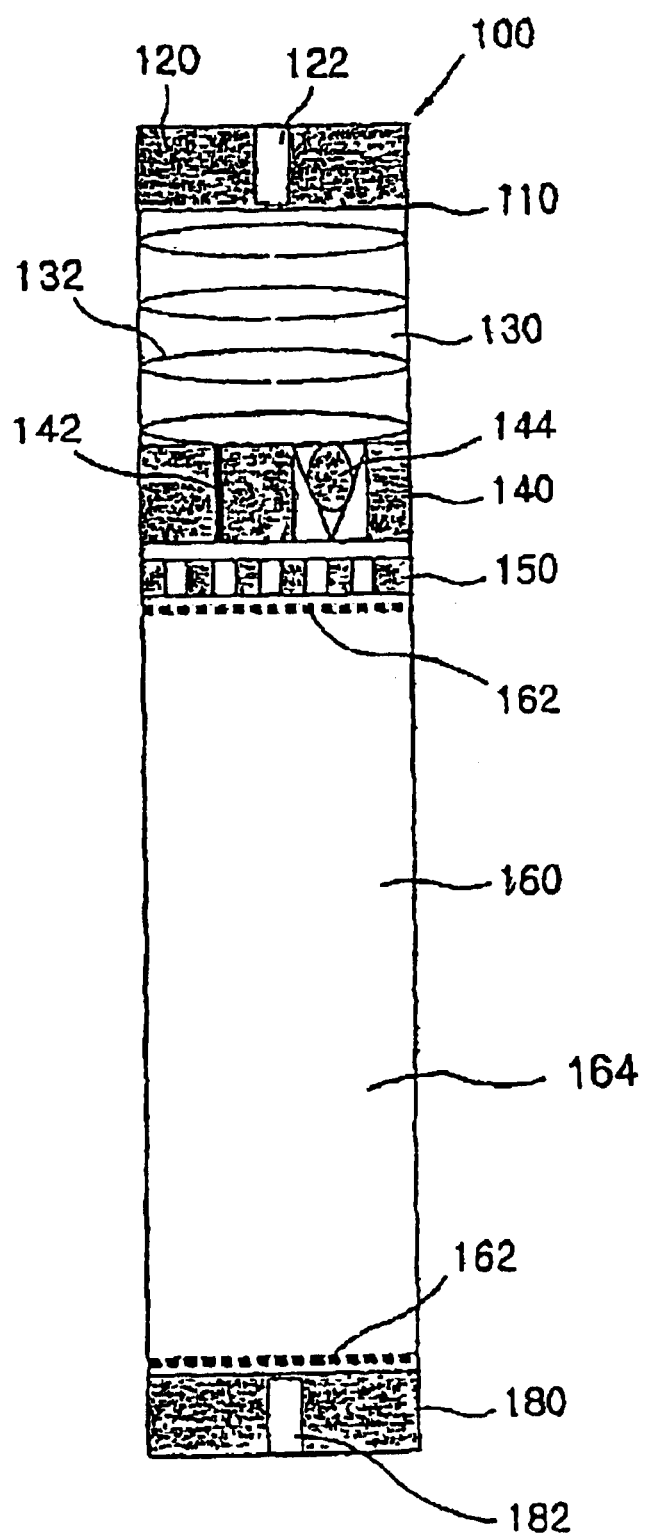
FIG. 2A is a sectional view of a concentrating chamber in the oxygen concentrating apparatus according to a first embodiment of the present invention.

FIG. 2A is a sectional view of a concentrating chamber in the oxygen concentrating apparatus according to a first embodiment of the present invention.

Referring to FIG. 2A, an oxygen concentrating chamber 100 according to a first embodiment of the present invention is configured by a casing 110 having upper and lower openings. Upper and lower manifolds 120 and 180 are formed in the upper and lower ends of the casing 110.

An oxygen storage unit 130, a check valve unit 140, a porous plate 150, and an adsorption unit 160 are stacked in the casing 110, one over another in turn.

In more detail, the check valve unit 140 includes a check valve 144 for moving the concentrated oxygen to the oxygen storage unit if an internal pressure in the adsorption unit reaches a predetermined pressure after the oxygen has started to be concentrated, and an orifice 142 for counter-flowing part of the concentrated oxygen of the high pressure into the adsorption unit if the pressure in the adsorption unit is lowered, and rinsing the nitrogen adsorbed in the adsorption material.

The porous plate 150 is formed of a plurality of vents.

The adsorption unit further includes upper and lower nets 162 for preventing an adsorption material 164 from flowing up and down. Paths 122, 182 for the inlet and outlet of gases are provided at the upper and lower ends of the oxygen concentrating chamber 100.

Further, the oxygen storage unit 130 is positioned between the upper manifold 120 and the check valve unit 140, in which a spring 132 is interposed.

Figure 2B:
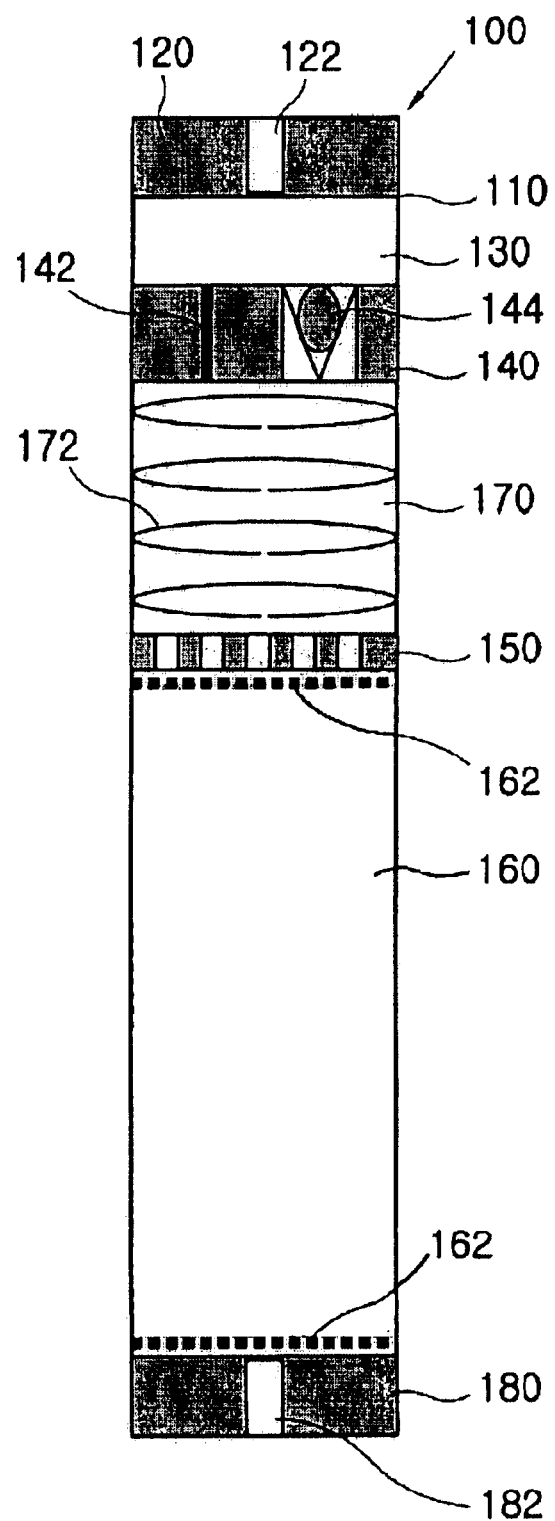
FIG. 2B is a sectional view of a concentrating chamber in the oxygen concentrating apparatus according to a second embodiment of the present invention.

FIG. 2B is a sectional view of a concentrating chamber in the oxygen concentrating apparatus according to a second embodiment of the present invention.

Referring to FIG. 2B, an oxygen concentrating chamber 100 according to a second embodiment of the present invention is configured by a casing 110 having upper and lower openings. Upper and lower manifolds 120 and 180 are formed in the upper and lower ends of the casing 110.

An oxygen storage unit 130, a check valve unit 140, a porous plate 150, and an adsorption unit 160 are stacked in the casing 110, one over another in turn.

In more detail, the check valve unit 140 includes a check valve 144 for moving the concentrated oxygen to the oxygen storage unit if an internal pressure in the adsorption unit reaches a predetermined pressure after the oxygen has started to be concentrated, and an orifice 142 for counter-flowing part of the concentrated oxygen of the high pressure into the adsorption unit if the pressure in the adsorption unit is lowered, and rinsing the nitrogen adsorbed in the adsorption material.

The porous plate 150 is formed of a plurality of vents. The porous plate 150 forms a plurality of holes in order to prevent the adsorption material from breaking away in the adsorption unit 160. In addition to the porous plate 150, upper and lower nets 162 are provided in the upper and lower ends of the adsorption unit 160 respectively. Paths 122. 182 for the inlet and outlet of eases are provided at the upper and lower ends of the oxygen concentrating chamber 100.

In particular, the porous plate 150 forms a path through which the oxygen gases after adsorption move in the state of a predetermined pressure, in which case the moving oxygen is spread uniformly, to thereby make the oxygen flow at the same speed and thus enhance a yield of oxygen.

A mixed space 170 is formed between the check valve unit 140 and the adsorption unit 160, in which a buffer spring 172 is provided.

The spring 172 plays a role of compressing the adsorption material since the volume of the adsorption material filled between the upper and lower porous nets 162 is reduced as time lapses.

In particular, the mixed space is a space where oxygen after nitrogen has been separated from the supplied air is temporarily collected, during which the oxygen is mixed to uniform an oxygen purity. Likewise, during rinsing, the locally introduced oxygen is expanded in the mixed space and then uniformly moves into the adsorption unit. Such a temporary staying of oxygen in the mixed space helps an increase of a yield of oxygen.

Figure 3A:
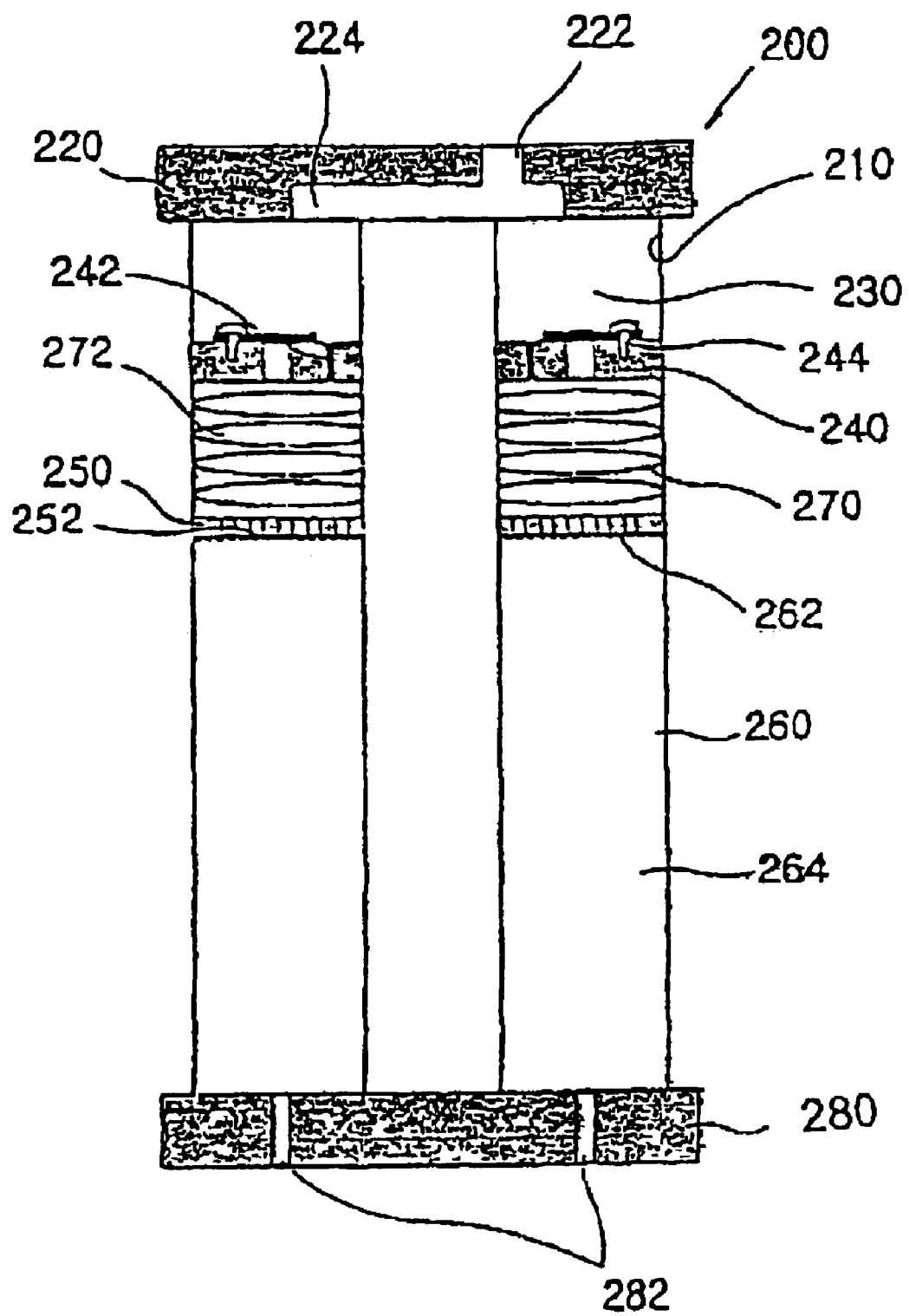
FIG. 3A is a sectional view of a concentrating chamber in the oxygen concentrating apparatus according to a third embodiment of the present invention.

FIG. 3A is a sectional view of a concentrating chamber in the oxygen concentrating apparatus according to a third embodiment of the present invention.

Referring to FIG. 3A, an oxygen concentrating chamber 200 according to a third embodiment of the present invention is configured by a plurality of casings 210 each having upper and lower openings. A support shaft is formed between the casings 210. An upper manifold 220 forming a concentrated oxygen supply path 222 and an oxygen storage unit 224 is formed on the upper end of the plurality of casings 210 in the oxygen concentrating chamber 200. A lower manifold 280 forming two paths 282 for a supply of the compressed air and an exhaust of nitrogen after rinsing is formed on the lower end of the plurality of casings 210 in the oxygen concentrating chamber.

The oxygen concentrating chamber 200 includes an oxygen storage unit 230 at the lower portion of the upper manifold 220 in each casing 210, and simultaneously a predetermined space is provided between the two casings 210.

A check valve unit 244 formed of an orifice 242 and a check valve 244 is disposed in the upper portion of each casing 210 of the concentrating chamber 200.

In the lower portion of the check valve unit 240 in each casing 210 is formed a mixed space 270 in which a spring 272 is provided. A porous plate 250 and an adsorption unit 260 are stacked below the check valve unit 240, one over another in turn.

The adsorption unit 260 further includes a net 252 in the upper end of the adsorption unit 260, in order to prevent an adsorption material 264 from flowing up and down.

Figure 3B:
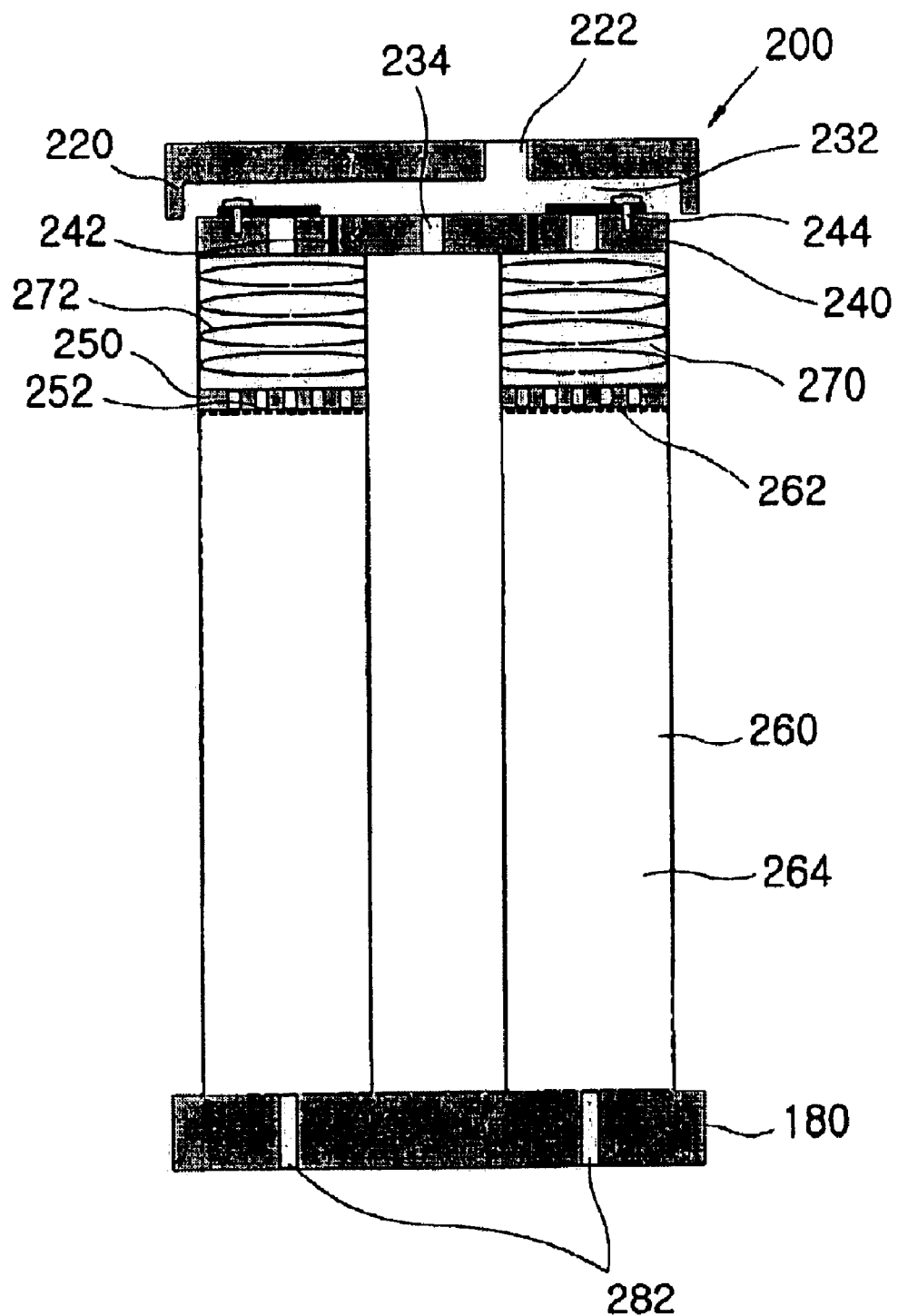
FIG. 3B is a sectional view of a concentrating chamber in the oxygen concentrating apparatus according to a fourth embodiment of the present invention.

FIG. 3B is a sectional view of a concentrating chamber in the oxygen concentrating apparatus according to a fourth embodiment of the present invention.

Referring to FIG. 3B, an oxygen concentrating chamber 200 according to the fourth embodiment of the present invention is configured by a plurality of casings 210 each having upper and lower openings. A support shaft is formed between the casings 210. An upper manifold 220 forming a concentrated oxygen supply path 222 is formed on the upper end of the plurality of casings 210 in the oxygen concentrating chamber 200. A lower manifold 280 forming two paths 282 for a supply of the compressed air and an exhaust of nitrogen after rinsing is formed on the lower end of the plurality of casings 210 in the oxygen concentrating chamber 200.

The oxygen concentrating chamber 200 includes an oxygen storage unit 232 at the lower portion of the upper manifold 220 in each casing 210, and simultaneously a predetermined space is provided as an oxygen storage space between the two casings 210.

In the upper opening of each casing 210 in the concentrating chamber 200 are installed an orifice 242 and a check valve 244 with a vent 234 in the center. A check valve unit 240 including an orifice and a check valve in each casing 210 is positioned in contact with the lower surface of the upper manifold 220.

In the lower portion of the check valve unit 240 in each casing 210 is formed a mixed space 270 in which a spring 272 is provided. A porous plate 250 and an adsorption unit 260 are stacked below the check valve unit 240, one over another in turn.

The adsorption unit 260 further includes a net 252 in the upper end of the adsorption unit 260, in order to prevent an adsorption material 264 from flowing up and down.

Figure 4A:
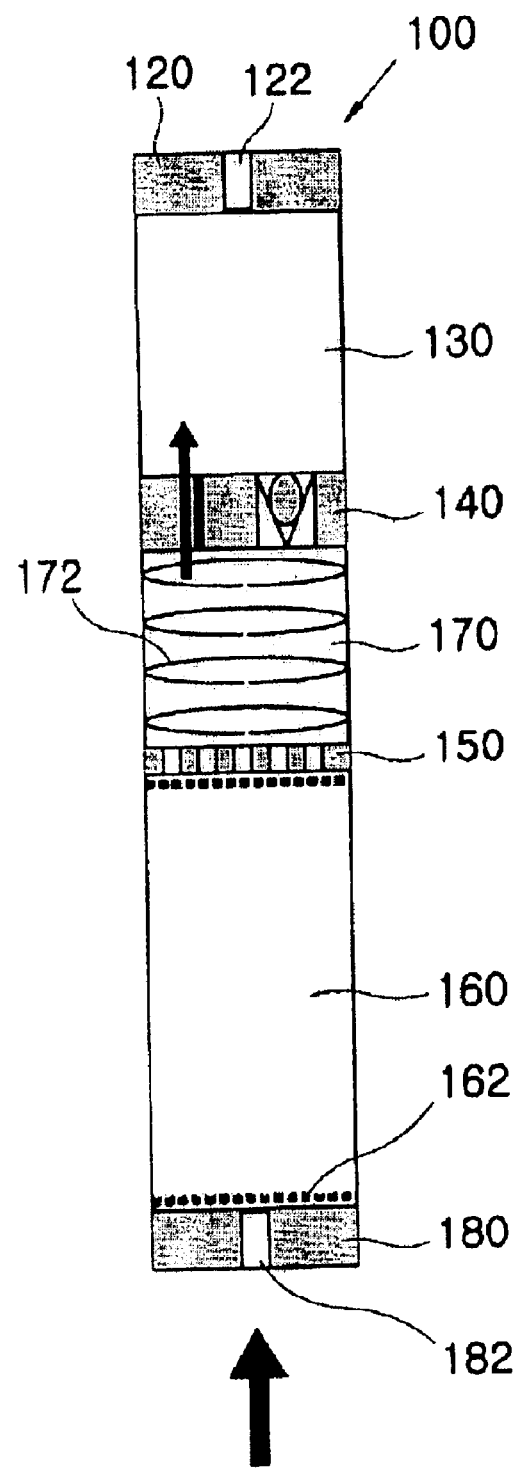
FIGS. 4A through 4D are sectional views illustrating working processes in the concentrating chamber in the oxygen concentrating apparatus according to the present invention.
Figure 4B:
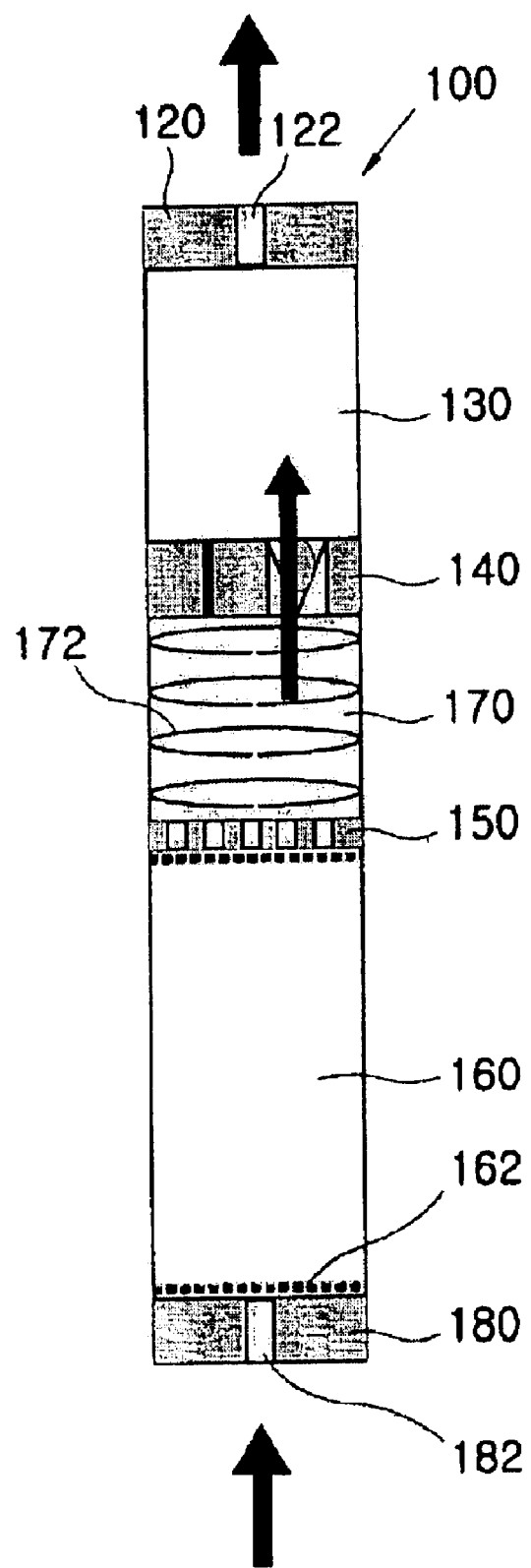
Figure 4C:
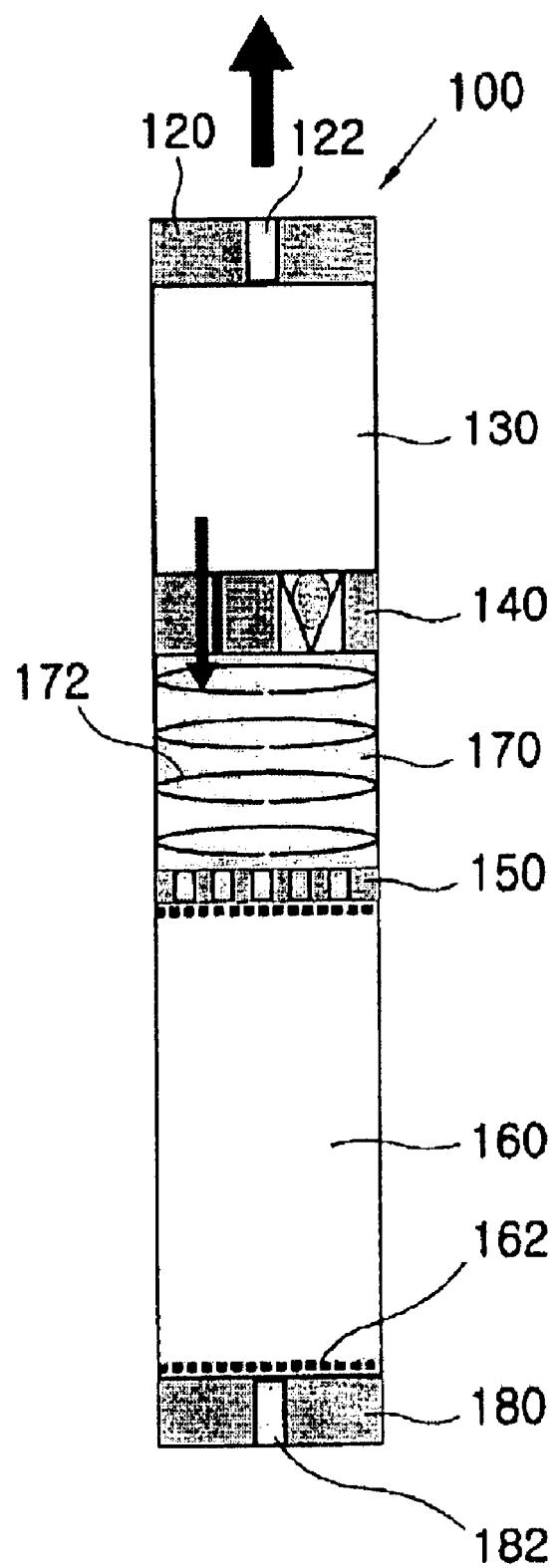
Figure 4D:
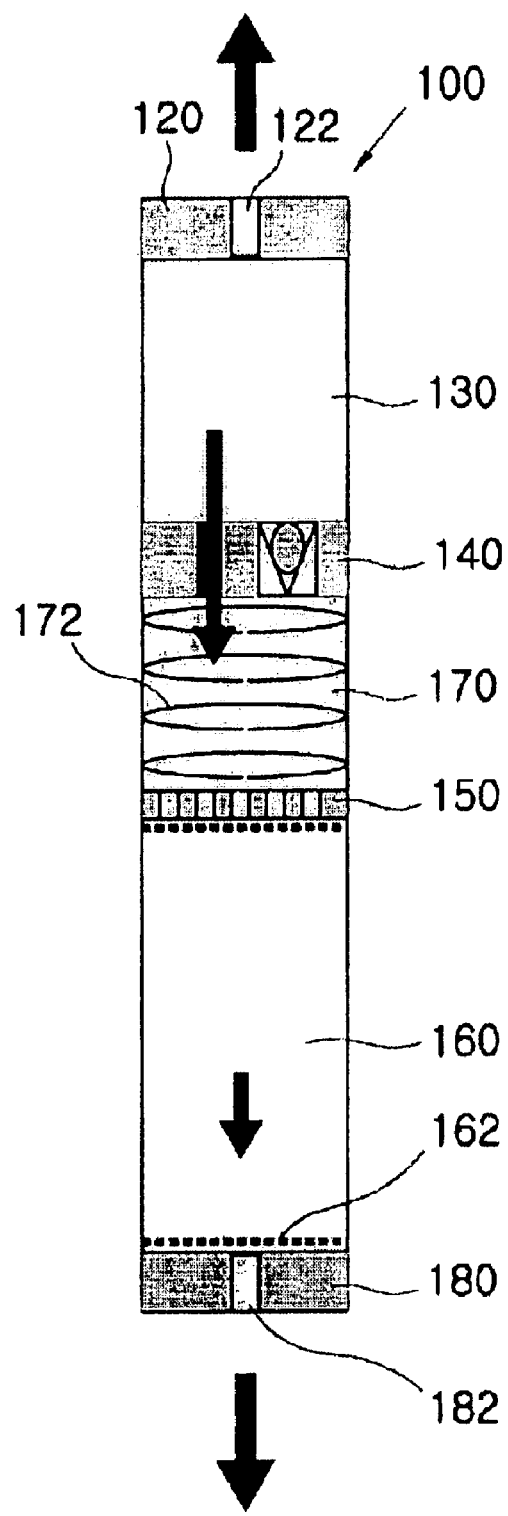
Figure 5:
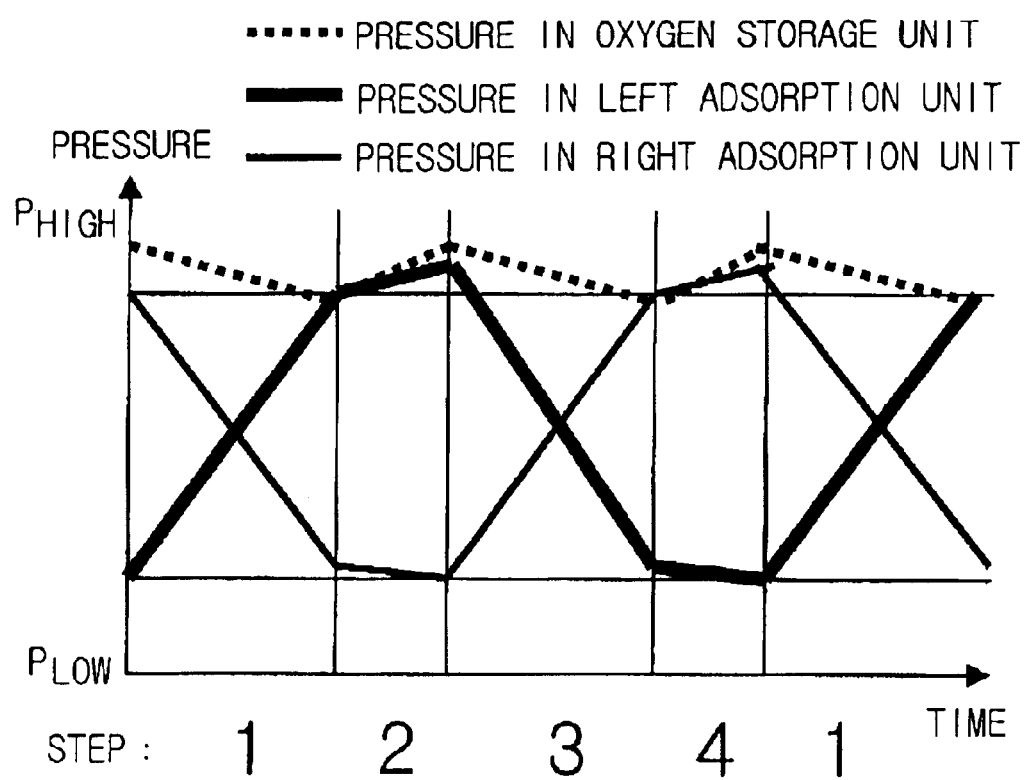
FIG. 5 is a graphical view illustrating an oxygen concentrating process in a concentrating chamber in the oxygen concentrating apparatus according to the present invention.

FIGS. 4A through 4D are sectional views illustrating working processes in the concentrating chamber in the oxygen concentrating apparatus according to the present invention. FIG. 4A illustrates a process of a supply of compressed air and an initial storage of part of oxygen. FIG. 4B illustrates a process where a check valve is opened and then concentrated oxygen is moved in the case that oxygen is left mostly because of nitrogen adsorption of the compressed air. FIG. 4C illustrates an initial state where the concentrated oxygen is counter-flown to an orifice according to a difference in pressures immediately after oxygen has been transferred. FIG. 4D illustrates a process of rinsing nitrogen from the adsorption material while counter-flowing the concentrated oxygen through an orifice. FIG. 5 is a graphical view illustrating a process of storing oxygen and rinsing nitrogen according to a variation in the pressure of the concentrated oxygen in a concentrating chamber in the oxygen concentrating apparatus according to the present invention.

An operation of the present invention will be described step by step with reference to the accompanying drawings.

First Step

FIG. 5 illustrates pressures of first and second adsorption units around a plurality of concentrating chambers. Here, it is advantageous that the plurality of concentrating chambers are made to operate simultaneously but reversely. However, in the case of a single concentrating chamber, the operation can be described by selecting one of pressure variation curves.

First, assuming that a thick solid line is a first adsorption unit pressure curve, and a dotted line is an oxygen storage unit pressure curve, a first step on the FIG. 5 graph indicates that the air compressed by the compressor 10 is introduced into the lower manifold through the valve 20. The solenoid valve can be additionally effected to the manifold.

As nitrogen is detached in a previous fourth step and then exhausted externally, the pressures of the adsorption units 160 and 260 are lowered down to a pressure $P_L$. Thus, the adsorption units 160 and 260 are pressurized by the introduced air ($P_L \rightarrow P_H$).

The exhaustion of the air introduced into the adsorption units 160 and 260 is stopped by the check valve 244 and the orifice 242. Accordingly, nitrogen starts to be adsorbed to thereby increase an internal pressure and oxygen purity gradually.

During pressurization, the check valve is closed by a pressure difference, and part of oxygen is moved into the oxygen storage unit through the orifice. The pressure in the oxygen storage unit falls consistently since oxygen is supplied to a user. Part of air is blown into the orifice to lengthen a pressure declining time. As a result, a pressurization time, that is, a first step operational time can be extended.

Second Step

When the pressure in the first adsorption unit is larger than that in the oxygen storage unit, the pressure in the adsorption unit rises up and simultaneously nitrogen components among the introduced air are adsorbed to the adsorption material. Accordingly, only oxygen is left at the gaseous state, and the oxygen is moved into the oxygen storage units 130 and 230 through the check valve 244. Here, movement of the oxygen through the orifice is ignorable.

That is, as the pressurized air passes through the adsorption material, nitrogen is adsorbed to the adsorption material, and oxygen passes through the check valve and is stored into the oxygen storage unit located in the upper manifold. Thus, the pressure in the oxygen storage unit rises up.

Third Step

If the air introduced into the lower manifold is interrupted in order to detach nitrogen after oxygen has been obtained from the adsorption unit, the pressure in the adsorption unit is lowered to a pressure $P_L$. Here, since the check valve is closed, the air in the oxygen storage unit does not counter-flow.

Fourth Step

At the process that the pressure in the adsorption unit is lowered, part of the oxygen in the oxygen storage unit counter-flows through the orifice. This oxygen plays a role of rinsing nitrogen.

Since this rinsing happens independently in the present invention differently from the existing technology, an independent rinsing operation is performed. Thus, the concentrating chamber has been described as an independent concentrating chamber.

That is, the detached nitrogen remaining at the gaseous state in the adsorption unit is blown with oxygen.

The fourth step and the third step are not distinctively distinguished. This is because the third step operation time is instantaneous.

In the fourth step, oxygen is separated and extracted with only one adsorption unit and the internal adsorption material is restored.

If the rinsing of the adsorption material is completely finished, the lower manifolds 180 and 280 are made to operate, to thereby re-introduce the compressed air and re-adsorb nitrogen to concentrate oxygen repeatedly.

In the case that the above four-step process is performed in two adsorption units, the two adsorption units are made to operate mutually reversely in use of oxygen, to thus accomplish a more effective result.

In the FIG. 5 graph, a thin solid line indicates the pressure in a second adsorption unit.

In the case that two or more adsorption units are made to operate, the compressed air is consumed less, and thus a loss becomes less, it is advantageous in applications and commercializations. An example of an application is shown in FIGS. 3A and 3B.

That is, if air is introduced into the lower side of the adsorption unit, the air flows and passes through the adsorption material. However, since the check valve is closed, the internal pressure in the adsorption unit rises up due to the introduced air. During the rise-up step of pressure, nitrogen is adsorbed to the adsorption material together with the pressure rise-up.

Thus, the oxygen purity is increased relatively. If the check valve is opened by a pressure difference after a predetermined time lapses, the internal oxygen passes through the porous plate, the buffer space, and the check valve and then is introduced into the oxygen storage unit.

In particular, after oxygen has been obtained through nitrogen adsorption, the air introduced into the concentrating chamber is interrupted to lower the pressure and extract the internal air, in which case the check valve is closed and nitrogen adsorbed in the adsorption material is detached and exhausted downwards. At this process, part of the oxygen in the oxygen storage unit counter-flows into the space filled with the adsorption material through the orifice. In this manner, nitrogen is detached, and the thus-produced high purity oxygen passes through a pressure controller connected with the upper manifold and is supplied to a user with a predetermined pressure through a flow meter.

The present invention can perform an oxygen concentration with a system having only one concentrating chamber called an independent rinsing in which the concentrating chamber can be independently rinsed by using a production gas produced in the concentrating chamber, differently from the existing oxygen concentrating process.

In the present invention, the gas produced in the concentrating chamber is stored in the independent oxygen storage unit while having an independent rinsing function. Accordingly, such a function is called an independent rinse and storage (IRS) function, which can perform the entire process of an oxygen concentration with only one concentrating chamber or irrespective of the number of the concentrating chambers.

As described above, the oxygen concentrating chamber according to the present invention includes an orifice, a check valve and an oxygen storage tank, to thus configure an oxygen concentrating apparatus more simply with a smaller number of components than that of the existing produce, by using a manifold to which a solenoid valve is attached.

Since the oxygen concentrating chamber according to the present invention can configure a complicated connection among an adsorption unit, an oxygen storage unit, an orifice, and a check valve, simply in the concentrating chamber, a complicated tube connection in the upper portion of the adsorption tower can be simplified. Also, the oxygen concentrating apparatus can be configured to have a number of merits such as cost-down, production improvement, lowering of trouble making, etc.

Also, when a manifold capable of directly connecting the concentrating chamber and the solenoid valve is used, a simpler oxygen concentrating apparatus can be configured.

The present invention improves a productivity, and reduces a trouble and an after-service frequency of occurrence since the number of components in the concentrating chamber is reduced, to accordingly enhance a product durability and reliability.

Also, the present invention provides an advantage capable of realizing various designs, with a simple structure in designing peripheral devices of an oxygen concentrating apparatus, and cases.

What is claimed is:

1. A concentrating chamber in an oxygen concentrating apparatus, the concentrating chamber comprising:

an oxygen concentrating chamber main body including an oxygen storage unit, a check valve unit and an adsorption unit which are stacked one over another in turn, in a casing having upper and lower openings;

an upper manifold assembled in the upper end of the main body, forming a concentrated oxygen supply path; and a lower manifold assembled in the lower end of the main body, for supplying compressed air and simultaneously exhausting rinsed nitrogen.

2. The concentrating chamber of claim 1, wherein:

said adsorption unit is positioned at the lowermost layer of the casing, for performing an oxygen concentration together with nitrogen separation through the supplied compressed air and counter-flowing the stored oxygen to perform a nitrogen rinsing in the casing;

said check valve unit for supplying the oxygen concentrated in the adsorption unit and controlling the oxygen of a high pressure to counter-flow, to wash an adsorption material in the adsorption unit; and said oxygen storage unit for temporarily storing the concentrated oxygen supplied from the check valve unit.

3. The concentrating chamber of claim 2, wherein said check valve unit comprises a check valve for moving the concentrated oxygen to the oxygen storage unit if an internal pressure in the adsorption unit reaches a predetermined pressure after the oxygen has started to be concentrated, and an orifice for counter-flowing part of the concentrated oxygen of the high pressure into the adsorption unit if the pressure in the adsorption unit is lowered, and rinsing the nitrogen adsorbed in the adsorption material.

4. The concentrating chamber of claim 2, wherein said adsorption unit comprises a porous plate which is movable up and down and upper and lower nets between which the adsorption material is filled, for preventing the adsorption material from flowing up and down.

5. The concentrating chamber of claim 2, further comprising a mixed space between the check valve unit and the adsorption unit, in which the stored oxygen is temporarily stayed and mixed.

6. The concentrating chamber of claim 5, further comprising a spring interposed in the mixed space, for depressing a porous plate with a predetermined elastic force in order to increase a contact with the compressed air, since the adsorption material is reduced as time lapses.

7. A concentrating chamber in an oxygen concentrating apparatus, the concentrating chamber comprising:

an oxygen concentrating chamber main body including a pair of casings each having upper and lower openings, in which an oxygen storage unit, a check valve unit and an adsorption unit are included in each casing, so that the pair of casings form an independent concentrating chamber for performing a concentration operation, respectively and are connected with each other;

an upper manifold commonly connected with the upper openings of the concentrating chambers, for temporarily storing the concentrated oxygen obtained from each concentrating chamber; and a lower manifold commonly connected with the lower openings of the concentrating chambers, forming an air inhale and exhaust path for supplying a predetermined compressed air to the concentrating chambers and simultaneously exhausting rinsed nitrogen after nitrogen rinsing has been completed in the concentrating chambers.

8. The concentrating chamber of claim 7, wherein said check valve unit comprises a check valve for moving the concentrated oxygen to the oxygen storage unit if an internal pressure in the adsorption unit reaches a predetermined pressure after the oxygen has started to be concentrated, and an orifice for counter-flowing part of the concentrated oxygen of the high pressure into the adsorption unit if the pressure in the adsorption unit is lowered, and rinsing the nitrogen adsorbed in an adsorption material.

9. The concentrating chamber of claim 7, wherein said adsorption unit and said check valve unit are installed in the concentrating chamber and said oxygen storage unit is formed in said upper manifold.

10. The concentrating chamber of claim 9, wherein said adsorption unit comprises a porous plate which is movable up and down and upper and lower nets between which an adsorption material is filled, for preventing the adsorption material from flowing up and down.

11. The concentrating chamber of claim 10, further comprising a spring, for depressing the porous plate with a predetermined elastic force in order to increase a contact with the compressed air since the adsorption material is reduced as time lapses.

12. The concentrating chamber of claim 9, further comprising a mixed space between the check valve unit and the adsorption unit, in which the stored oxygen is temporarily stayed and mixed.

13. The concentrating chamber of claim 9, wherein two or more concentrating chambers are connected in succession.

14. A concentrating chamber in an oxygen concentrating apparatus, the concentrating chamber comprising:

an oxygen concentrating chamber main body including a pair of casings each having upper and lower openings, in which an adsorption unit is included in each casing, so that the pair of casings form independent first and second concentrating sub-chambers and are connected with each other;

an upper manifold commonly connected with the upper openings of the first and second concentrating sub-chambers, for temporarily storing the concentrated oxygen obtained from each concentrating sub-chamber, in which a check valve and an orifice respectively corresponding to each of the concentrating sub-chambers is formed in the lower side of the upper manifold and an oxygen storage unit is formed in the upper side of the upper manifold; and a lower manifold commonly connected with the lower openings of each of the concentrating sub-chambers, forming an air inhale and exhaust path for supplying a predetermined amount of compressed air in to each of the concentrating sub-chambers and simultaneously exhausting rinsed nitrogen after nitrogen rinsing has been completed in each of the concentrating sub-chambers.

15. The concentrating chamber of claim 14, wherein said upper manifold comprises said check valve for moving the concentrated oxygen to the oxygen storage unit if an internal pressure in the adsorption unit reaches a predetermined pressure after the oxygen has started to be concentrated, and said orifice for counter-flowing part of the concentrated oxygen of the high pressure into the adsorption unit if the pressure in the adsorption unit is lowered, and rinsing the nitrogen adsorbed in an adsorption material.

16. The concentrating chamber of claim 14, wherein said oxygen storage unit is formed between the first and second concentrating sub-chambers and a vent for communicating with the storage unit is formed in the lower side of the upper manifold between the first and second concentrating sub-chambers.

17. The concentrating chamber of claim 14, wherein each of said adsorption units comprise a porous plate which is movable up and down and upper and lower nets between which an adsorption material is filled, for preventing the adsorption material from flowing up and down.

18. The concentrating chamber of claim 14, wherein each of the first and second concentrating sub-chambers include a mixed space called a dead zone that is formed between the upper manifold and the adsorption unit.

19. The concentrating chamber of claim 18, wherein each of the first and second concentrating sub-chambers further comprise a spring interposed in the mixed space, for depressing a porous plate with a predetermined elastic force in order to increase a contact with the compressed air since an adsorption material is reduced as time lapses.

* * * * *